(No Model.)

E. A. HADLEY.
TENSION DEVICE.

No. 588,424. Patented Aug. 17, 1897.

Witnesses:
F. L. Ourand.

Inventor:
Edwin A. Hadley,
Attorneys.

THE NORRIS PETERS CO., PHOTO-LITHO., WASHINGTON, D. C.

UNITED STATES PATENT OFFICE.

EDWIN A. HADLEY, OF SCOTIA, NEBRASKA.

TENSION DEVICE.

SPECIFICATION forming part of Letters Patent No. 588,424, dated August 17, 1897.

Application filed January 22, 1897. Serial No. 620,254. (No model.)

*To all whom it may concern:*

Be it known that I, EDWIN A. HADLEY, a citizen of the United States, and a resident of Scotia, in the county of Greeley and State of Nebraska, have invented certain new and useful Improvements in Tension Devices; and I do hereby declare that the following is a full, clear, and exact description of the invention, which will enable others skilled in the art to which it appertains to make and use the same, reference being had to the accompanying drawings, which form a part of this specification.

My invention relates to a twine or cord tension device principally designed for use with self grain-binders, although it may be used with advantage in other machines.

The invention has for its object to provide an improved tension device in which the desired tension is produced by means of two rings between which the twine or string passes, which rings are held together by spring-pressure, and so arranged that when they become worn they may be turned so as to present new surfaces to the twine.

The invention consists in the novel construction and combination of parts hereinafter fully described and claimed.

Figure 1:
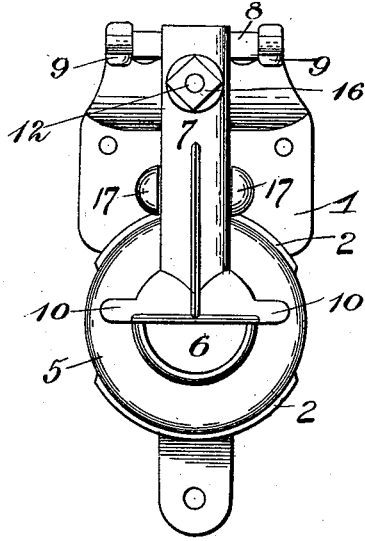
Figure 2:
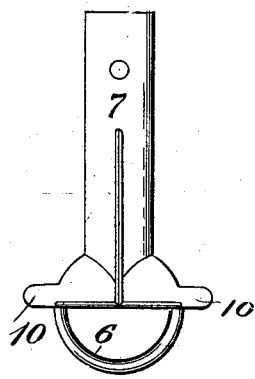
Figure 3:
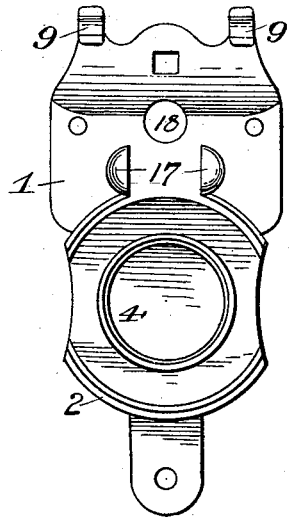
Figure 4:
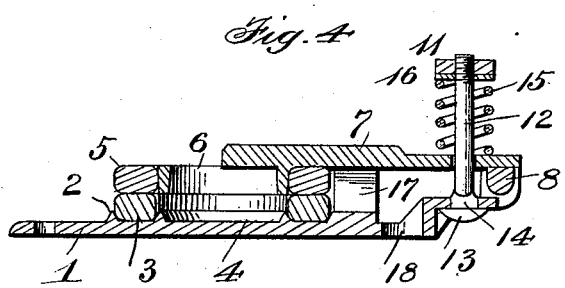
Figure 5:
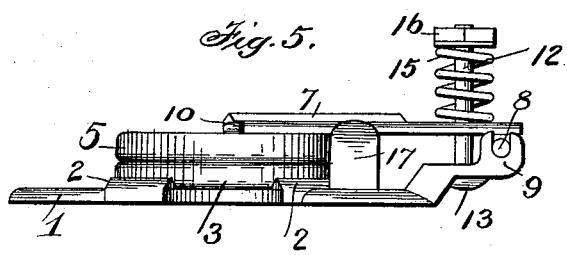

In the accompanying drawings, Figure 1 is an elevation of a twine or cord tension device constructed in accordance with my invention. Fig. 2 is a similar view of the spring-actuated arm which holds the rings together removed. Fig. 3 is a similar view of the back plate which carries the working parts of the device. Fig. 4 is a central longitudinal section of the device. Fig. 5 is a side elevation of the same.

In the said drawings the reference-numeral 1 designates a plate adapted to be secured to the twine case or holder of a grain-binder. Near its lower end this plate is formed with two segmental flanges 2 2, with which engages the periphery of a tension-ring 3, seated upon the said plate. The said plate is also formed with a circular flange 4, with which the inner surface of the said ring engages. These flanges hold the said ring in place on the plate, yet permit it to be turned or rotated. In front of said ring is a corresponding ring 5, which engages with a circular head 6 on the lower end of an arm 7, the upper end of which bears upon an angular rock-bar 8, journaled in lugs 9 at the upper end of the plate 1. The said head 6 is provided with two opposite lugs 10, which bear against the ring 5. Passing through an angular hole in the upper part of plate 1, and also through said arm, is a bolt 12, having a head 13 and an angular portion 14, which engages with said angular hole and prevents the bolt from turning. Encircling this bolt is a coiled spring 15, bearing against the arm 7 and confined in place by a nut 16, engaging with the screw-threaded end of bolt 12. The tension of the spring can also be regulated by this nut.

The numeral 17 designates two guide-lugs for the arm 7, formed with or secured to the plate 1. The upper end of the plate 1, as seen in Fig. 4, is formed with a hole or opening 18 for the passage of the twine or cord.

The tension-rings may be made of glass, metal, or other hard material to resist wear.

The operation is as follows: The device is secured to the case or holder which contains the twine or cord, and the latter is passed through the opening 18 down between the tension-rings, which will clamp the same under proper tension through the medium of the arm 7, bolt, and coiled spring. When either or both of the said rings become worn, they may be turned so as to bring new surfaces in contact with the twine.

The device may be economically produced, and the arm and rings may be readily removed, when desired, by simply unscrewing the nut and removing the bolt.

Having thus fully described my invention, what I claim is—

1. In a tension device, the combination with the plate formed with two segmental flanges, and the tension-ring engaging therewith, of the spring-actuated arm having a circular head, and the tension-ring engaging therewith; substantially as described.

2. In a tension device, the combination with the plate formed with segmental flanges and with a circular flange, and the tension-ring located between said flanges, of the spring-actuated arm having a circular head, and the tension-ring engaging therewith; substantially as described.

3. In a tension device, the combination with the plate formed with segmental flanges and with a circular flange, the tension-ring located between said flanges, and the guide-lugs, of the spring-actuated arm having a circular head and lateral lugs, and the tension-ring engaging with said head; substantially as described.

4. In a tension device, the combination with the plate formed with lugs at the upper end, the angular rock-shaft, the segmental flanges and inner circular flange, the tension-ring located between said flanges and the guide-lugs, of the spring-actuated arm bearing upon said rock-shaft, having a circular head and lateral lugs at the lower end, the tension-ring engaging with said head, the headed screw-bolt passing through said plate and arm, the coiled spring and the nut; substantially as described.

In testimony that I claim the foregoing as my own I have hereunto affixed my signature in presence of two witnesses.

EDWIN A. HADLEY.

Witnesses:
 WILLIAM J. FULLER,
 JAMES G. FULLER.